United States Patent
Gao

(10) Patent No.: US 7,876,219 B2
(45) Date of Patent: Jan. 25, 2011

(54) MESSAGE LEAVING SYSTEM AND METHOD FOR DIGITAL PHOTO FRAME

(75) Inventor: Guo-Wei Gao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 296 days.

(21) Appl. No.: 12/237,232

(22) Filed: Sep. 24, 2008

(65) Prior Publication Data
US 2009/0315713 A1 Dec. 24, 2009

(30) Foreign Application Priority Data
Jun. 19, 2008 (CN) .................. 2008 1 0302232

(51) Int. Cl.
*G08B 13/24* (2006.01)
(52) U.S. Cl. ...................... 340/551; 340/541
(58) Field of Classification Search ................ 340/555, 340/541
See application file for complete search history.

(56) References Cited

U.S. PATENT DOCUMENTS

| | | | | |
|---|---|---|---|---|
| 4,748,756 A * | 6/1988 | Ross ..................... 40/715 |
| 5,359,374 A * | 10/1994 | Schwartz .................. 40/455 |
| 5,520,544 A * | 5/1996 | Manico et al. ............. 434/317 |
| 5,794,371 A * | 8/1998 | Camillery ................. 40/717 |
| 6,167,233 A * | 12/2000 | Gresser et al. ............ 434/308 |
| 6,396,472 B1 * | 5/2002 | Jacklin ..................... 345/104 |
| 7,519,703 B1 * | 4/2009 | Stuart et al. ............... 709/224 |
| 2002/0175513 A1 * | 11/2002 | Li .......................... 281/22 |
| 2006/0119707 A1 * | 6/2006 | Merrell et al. ........... 348/207.99 |
| 2007/0006501 A1 * | 1/2007 | Pierce et al. .............. 40/618 |
| 2008/0204359 A1 * | 8/2008 | Tsui et al. ................ 345/5 |
| 2008/0273126 A1 * | 11/2008 | Chang ..................... 348/836 |
| 2009/0298556 A1 * | 12/2009 | Raffle ..................... 455/575.1 |

* cited by examiner

Primary Examiner—Eric M Blount
(74) Attorney, Agent, or Firm—Clifford O. Chi

(57) ABSTRACT

A message leaving system for digital photo frame (DPF) is provided. The message leaving system includes a message recording unit configured to record a message in the DPF, a detecting sensor initiated by information sent from the message recording unit to detect human presence after a predetermined detecting time period from the message being stopped recording, a message reminding unit generating a notification signal to inform users to play the message when the detecting sensor detects human presence, and a message handling unit configured to store or delete the message after the message being played.

16 Claims, 2 Drawing Sheets

MESSAGE LEAVING SYSTEM AND METHOD FOR DIGITAL PHOTO FRAME

BACKGROUND

1. Technical Field

The present invention relates to systems and methods for leaving messages and, more particularly, to a system and method for leaving voice or video messages in a digital photo frame (DPF).

2. General Background

Digital photo frames (DPF) are becoming increasingly popular due to the convenience and ease of manipulation when browsing photos stored therein. When in use, the DPF is placed on a platform or hung on a wall to display the stored photos. The DPF has become prevalent in the home or office and a need for additional functions are needed.

What is needed, therefore, is a DPF with an additional function and a method for realizing the new function.

SUMMARY

A message leaving system for digital photo frame (DPF) is provided. The message leaving system includes a message recording unit configured to record a message in the DPF, a detecting sensor initiated by information sent from the message recording unit to detect human presence after a predetermined detecting time period after the message has stopped recording, a message reminding unit generating a notification signal to inform users to play the message when the detecting sensor detects human presence, and a message handling unit configured to store or delete the message after the message has played.

DETAILED DESCRIPTION OF THE EMBODIMENTS

Figure 1:
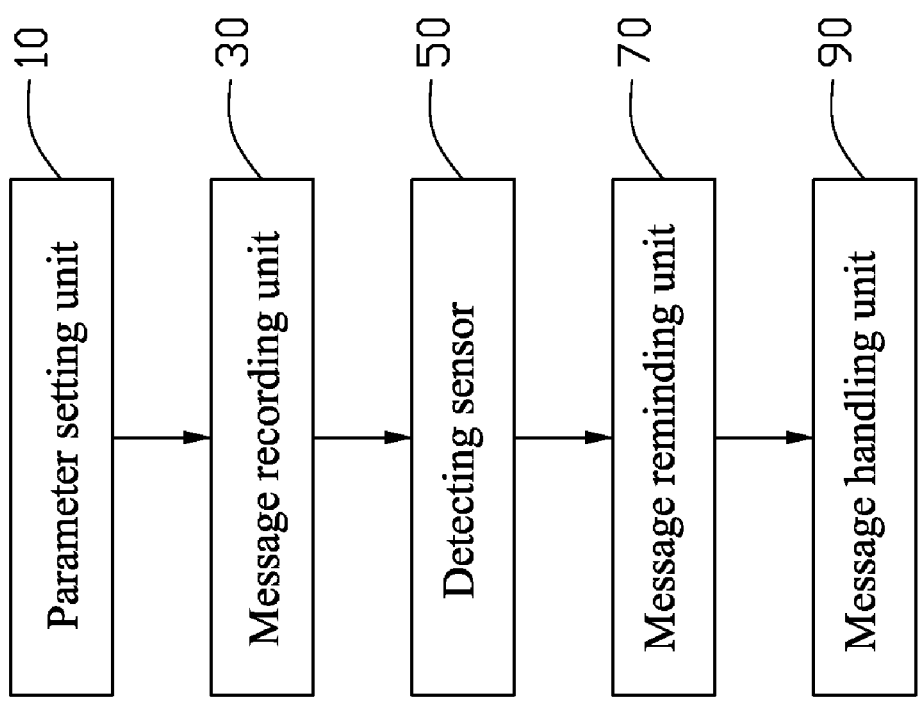
FIG. 1 is a block diagram of one embodiment of a message leaving system for a digital photo frame.

Referring to FIG. 1, one embodiment of a message leaving system for a digital photo frame (DPF) includes a parameter setting unit 10, a message recording unit 30 configured to record a message, a detecting sensor 50 configured to detect human presence after the message has been recorded, a message reminding unit 70 configured to remind a user to check the recorded message, and a message handling unit 90 configured to store or delete the recorded message after it has been reviewed by the user. The parameter setting unit 10 is configured to set different parameters to record messages.

Figure 2:
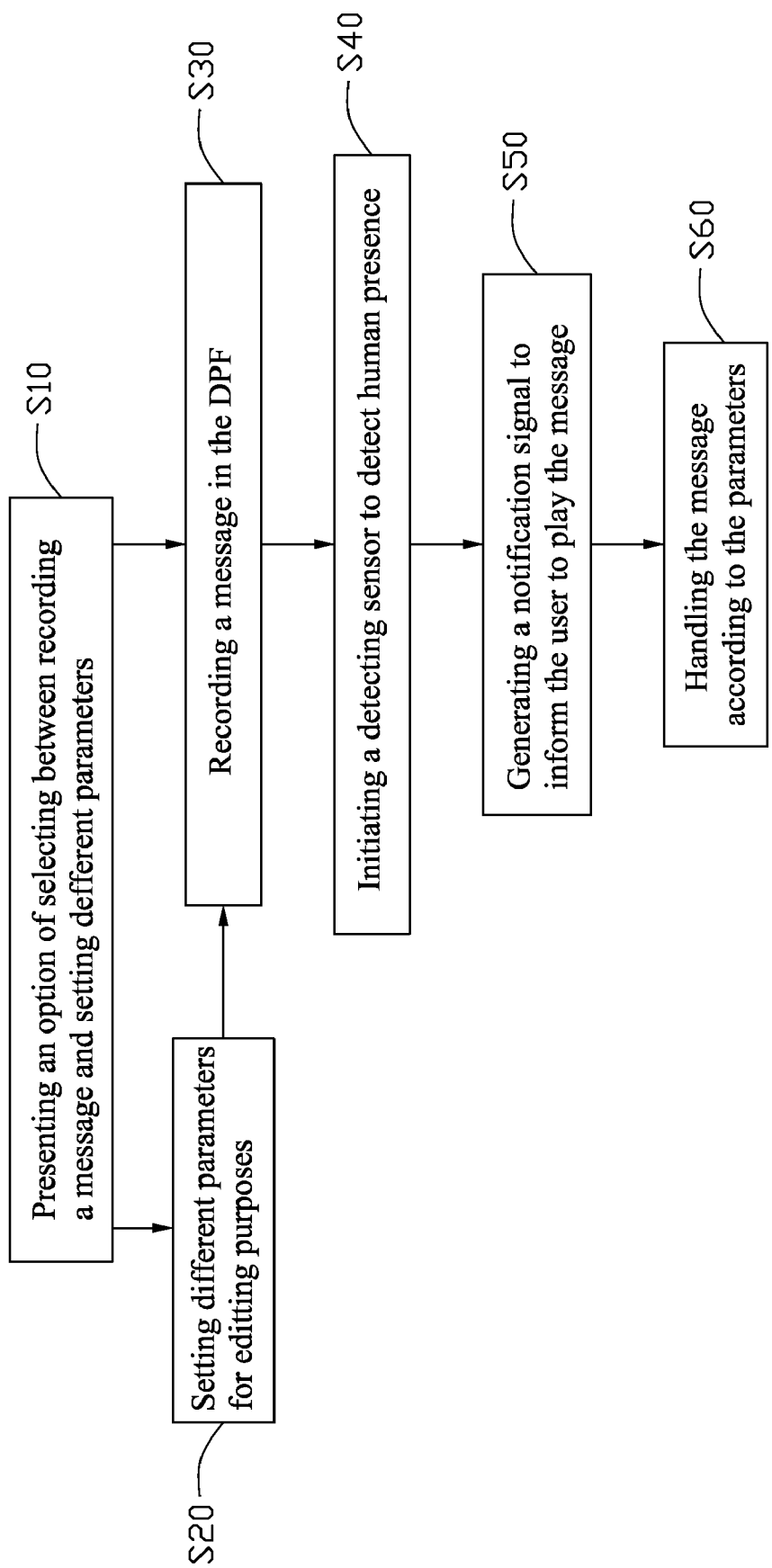
FIG. 2 is a flow chart of one embodiment of a message leaving method for a digital photo frame.

FIG. 2 is a flowchart illustrating one embodiment of a message leaving method. Depending on the embodiment, certain of the steps described below may be removed, others may be added, and the sequence of steps may be altered.

In step S10, the DPF is initiated and displays a main operating menu on a display screen of the DPF. Users may choose one of two options. The first option is to set different parameters for editing purposes. The second option is to record a message. If the first option is selected, the method continues to a step S20. If the second option is selected, the method continues to a step S30.

In the step S20, a dialogue frame for setting different parameters via the parameter setting unit 10 is shown on the display screen. The different parameters include a message recording format, a message alert time, a message reminding format, and a message handling scheme. For example, if the message recording format uses voice recordings as the message, the message format can be changed to use video recordings as message. The message alert time parameter represents a time period beginning from when the recorded message was recorded to initiating the detecting sensor 50. For example, if the detecting time is set to five minutes, the detecting sensor is initiated five minutes after the message has stopped recording. The reminding format parameter may be set to different notifications to alert the user that there is an unplayed message. The notifications may be by sound, light, or a combination of both. The message handling scheme allows the user to determine what happens to the recorded message after it has been played. The message handling scheme may be set to automatically store the message, automatically delete the message, or inquire the user whether to store or delete the message. After setting the different parameters, the method continues to the step S30.

In the step S30, the DPF records a message via the message recording unit 30. A message recording program is initiated to control a message recorder, such as a MP3 recorder and/or a camera to record and store the voice and/or image in a memory of the DPF. After the message is recorded, the message recording unit 30 sends information to the detecting sensor 50.

Continuing to the step S40, the message recording unit 30 sends information to initiate the detecting sensor 50 to detect a human presence. The detecting sensor 50 may be configured to detect sound or a change in magnetic field to indicate the human presence. For example, when someone is near the DPF, the detecting sensor 50 may detect the sound or magnetic field of the human body around the DPF and send information to initiate the message reminding unit 70.

Moving to the step S50, a notification signal is generated indicating that there is an unplayed message in the DPF. In one embodiment, the message reminding unit 70 controls a sound playing component positioned in the DPF to play a preset music as the notification signal to inform the user that there is an unplayed message. In another embodiment, the message reminding unit 70 controls a plurality of light emitting diodes (LED) to illuminate as the notification signal to users.

Continuing to a step S60, when the message is played by the user, the message handling unit 90 handles the message according to the presetted parameters. For example, if the message handling method is set to inquire every time, users can select to store or delete the message in an inquiring dialogue frame controlled by the message handling unit.

It is to be understood, however, that even though numerous characteristics and advantages of the embodiments have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A message leaving method for a digital photo frame (DPF), the method comprising:

recording a message via a message recording unit directly in the DPF;

initiating a detecting sensor to detect human presence after a predetermined detecting time period after the message has stopped recording; and generating a notification signal to inform a user to play the message.

2. The message leaving method as described in claim 1, further comprising setting a plurality of parameters before recording the message in the DPF.

3. The message leaving method as described in claim 2, further comprising presenting an option of selecting between recording the message and setting a plurality of different parameters.

4. The message leaving method as described in claim 3, wherein in response to selecting setting the different parameters, original parameters in the DPF are capable of being edited and the method is executed according to the edited parameters.

5. The message leaving method as described in claim 3, wherein the different parameters comprise a message recording format, a message alert time, a message reminding format, and a message handling scheme.

6. The message leaving method as described in claim 5, wherein the message recording format is selected from the group consisting of voice recordings and video recordings.

7. The message leaving method as described in claim 5, wherein the message reminding format is selected from the group consisting of sound notification, light notification, and both sound notification and light notification.

8. The message leaving method as described in claim 5, wherein the message handling scheme is selected from the group consisting of automatically storing the message, automatically deleting the message, and inquiring the user whether to store or delete the message.

9. A message leaving system for digital photo frame (DPF), comprising a message recording unit configured to record a message in the DPF;
   a detecting sensor initiated by information sent from the message recording unit to detect human presence after a predetermined detecting time period after the message has stopped recording;
   a message reminding unit generating a notification signal to inform users to play the message when the detecting sensor detects human presence; and
   a message handling unit configured to store or delete the message after the message has played.

10. The message leaving system as described in claim 9, wherein the message leaving system further comprises a parameter setting unit configured to set a plurality of parameters so that the message leaving system is capable of performing according to the parameters.

11. The message leaving system as described in claim 10, wherein the parameters comprise a message recording format, a message alert time, a message reminding format, and a message handling scheme.

12. The message leaving system as described in claim 11, wherein the message recording format is selected from the group consisting of voice recordings and video recordings.

13. The message leaving system as described in claim 11, wherein the message reminding format is selected from the group consisting of sound notification, light notification, and both sound notification and light notification.

14. The message leaving system as described in claim 11, wherein the message handling scheme is selected from the group consisting of automatically storing the message, automatically deleting the message, and inquiring the user whether to store or delete the message.

15. The message leaving system as described in claim 9, wherein the detecting sensor detects human presence via detecting sound around the DPF.

16. The message leaving system as described in claim 9, wherein the detecting sensor detects human presence via detecting a change in magnetic field around the DPF.

* * * * *